United States Patent
Rozema et al.

[11] Patent Number: 6,086,355
[45] Date of Patent: Jul. 11, 2000

[54] ACTUATOR CARRIAGE FOR STRIPPER MECHANISM LINK ASSEMBLY

[75] Inventors: Henry J. Rozema, Brapton; Mandeep Thandi, Rexdale, both of Canada

[73] Assignee: Tradesco Mold Limited, Rexdale, Canada

[21] Appl. No.: 09/121,970

[22] Filed: Jul. 24, 1998

[51] Int. Cl.[7] .................................................. B29C 45/40
[52] U.S. Cl. .......................................... 425/556; 425/441
[58] Field of Search ............................... 425/556, 436 R, 425/441, 436 RM

[56] References Cited

U.S. PATENT DOCUMENTS

| | | | |
|---|---|---|---|
| 4,497,624 | 2/1985 | Brun et al. | 425/556 |
| 5,707,666 | 1/1998 | DiSimone et al. | 425/588 |
| 5,731,014 | 3/1998 | Travaglini | 425/556 |

Primary Examiner—Tim Heitbrink
Attorney, Agent, or Firm—Gowling, Strathy & Henderson

[57] ABSTRACT

An actuator carriage for a multi-level injection molding apparatus having mold core and mold cavity support plates, tie bars supporting a moveable platen and having stripper mechanisms associated with mold cores mounted to the mold core support plates. The stripper mechanisms are displaced relative to the mold cores by lever arms having cam surfaces engaging actuators carried by the actuator carriage. Each actuator carriage includes a support bar extending generally transversely relative to the tie bars with at least one of the actuators being mounted on the support bar. At least one connector bar is rigidly secured to the support bar and a respective of the mold cavity support plates. The connector bar maintains the support bar at a fixed distance from the mold cavity support plate. The support bar is moveable along at least one of the tie bars and has a lateral restraining device limiting lateral movement of the support bar toward respective of the tie bars.

9 Claims, 3 Drawing Sheets

ACTUATOR CARRIAGE FOR STRIPPER MECHANISM LINK ASSEMBLY

FIELD OF THE INVENTION

This invention relates to injection molding apparatus. More particularly, this invention relates to the actuation of a stripper mechanism in multi-level stack molds.

BACKGROUND OF THE INVENTION

In the manufacture of articles in a plastic injection molding process, it is necessary to strip molded articles from a mold core. One manner of stripping the articles is with a stripper plate associated with the mold core.

FIG. 1 is a front elevation illustrating a typical prior art stripper plate arrangement in the context of a multi-level molding apparatus generally indicated by reference 10. The apparatus 10 includes mold core support plates 12 and mold cavity support plates 14, mounted respectively to which are mold cores 16 and mold cavities 18. One of the mold core support plates is secured to a fixed platen 13 and the other is secured to a movable platen 15, the latter being carried by tie bars 20. The mold cavity support plates 14 are secured to a center manifold support plate 17.

A stripper plate 22 is associated with each mold core 16. The stripper plate 22 lies against the mold core 16 when the mold is closed and moves away from the mold core 16, as the mold approaches its fully open position. Movement of the stripper plate 22 away from the mold core 16 is caused by a lever arm 24 pivotably secured to the mold core support plates 12 by a connector 26. The lever arm 24 has a first leg 28 with a cam surface 30 which contacts a roller 32 serving as an actuator to cause clockwise rotation of the lever arm 24 about the connector 26 when the mold core 16 and mold cavity 18 reach a degree of separation determined by the location and profile of the cam surface 30. This causes a second leg 34 of the lever arm 24 to press against the stripper plate 22 to move the stripper plate 22 away from its associated mold core 16 to dislodge a molded article. The mold core support plates 14 are mounted on a center manifold plate support 17 which is also carried by the lowermost of the tie bars 20.

For simplicity, the operation of only one lever arm 24 is fully described above and illustrated in FIG. 1. In practice, at least one lever arm 24 would be associated with each mold level such as shown in dashed lines in FIG. 1. Furthermore, more than one lever arm 24 may be utilized at each mold level to balance the force being applied to the stripper plate 22.

In the prior art, the actuators or rollers 32 have been mounted directly on the mold cavity support plate 14. Such mounting has proven problematic, particularly in applications where deep parts are to be formed requiring considerable separation distances between the mold cores 16 and mold cavities 18 for stripping. In the prior art arrangement, large separation distances require very long first legs 28 on the lever arms 24 which reduces both rigidity and the amount of stripper platen movement for a given lever arm movement. Flex in the lever arms 24 caused by the use of long arms results in cocking of the stripper plate 22 further resulting in galling and jamming. Also, the first legs 28 of the lever arms 24 of adjacent mold levels have been positioned one behind the other to allow for overlap when the mold assembly is closed. The space required for overlap can cause interference with certain types of mold opening and closing linkage, such as, for example, the linkage arm arrangement illustrated in U.S. Pat. No. 5,707,666 (DiSimone et al.).

It is an object of the present invention to provide a stripper platen actuating arrangement which enables the use of considerably shorter lever arms than in the prior art arrangement described above.

It is a further object of the present invention to provide a stripper mechanism actuating arrangement which avoids interference with the mold opening and closing linkage.

SUMMARY OF THE INVENTION

An actuator carriage for a multi-level injection molding apparatus having mold core and mold cavity support plates, tie bars supporting a moveable platen and having stripper mechanisms associated with mold cores mounted to the mold core support plates. The stripper mechanisms are displaced relative to the mold cores by lever arms having cam surfaces engaging actuators carried by the actuator carriage. Each actuator carriage includes a support bar extending generally transversely relative to the tie bars with at least one of the actuators being mounted on the support bar. At least one connector bar is rigidly secured to the support bar and a respective of the mold cavity support plates. The connector bar maintains the support bar at a fixed distance from the mold cavity support plate. The support bar is moveable along at least one of the tie bars and has a lateral restraining means limiting lateral movement of the support bar toward respective of the tie bars.

In one embodiment, the actuator carriage extends between adjacent of the tie bars and may have two actuators mounted thereon.

The actuator carriage may include bearing members slidably engaging the tie bars for vertically and laterally locating the support bar relative to the tie bars.

The actuator carriage may be mounted with the support bar extending between an upper pair of the tie bars or between an upper and a lower tie bar.

DESCRIPTION OF DRAWINGS

The present invention is described in detail below with reference to the accompanying drawings in which.

DESCRIPTION OF PREFERRED EMBODIMENTS

Figure 1:
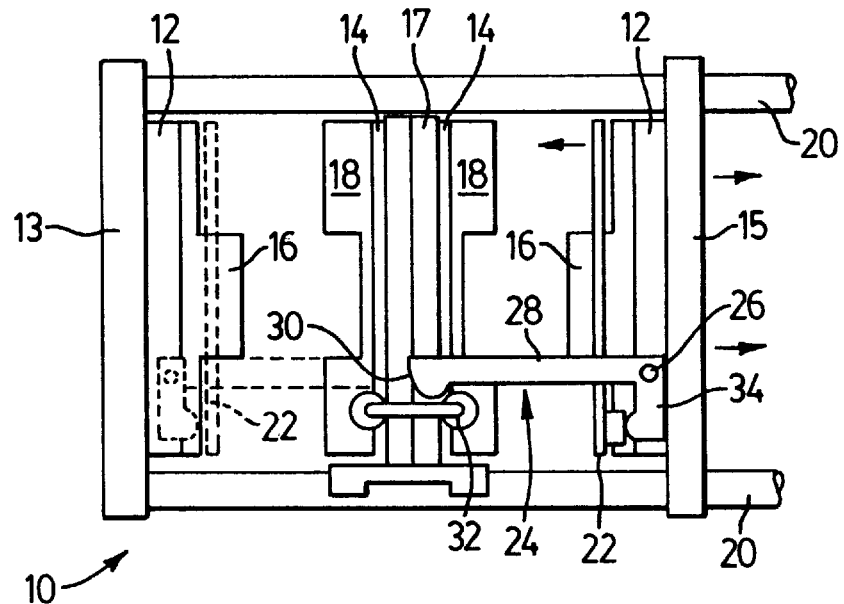
FIG. 1 is a front elevation of a prior art stripper plate arrangement.

Insofar as the above description is applicable to certain of the components illustrated in FIGS. 2 through 6, like reference numerals have been utilized and the reader is referred to the above description.

An actuator carriage according to the present invention is generally indicated by reference 40 in FIGS. 2 through 6. The actuator carriage 40 has a support bar 42 extending generally transversely relative to the tie bars 20. Actuators in the form of rollers 44 are mounted on the support bar 42 and engage the cam surfaces 30 of the lever arms 24.

Connector bars 46 extend between the support bar 42 and the mold cavity support plate 14 and are rigidly secured to the support bar 42 and the mold cavity support plate 14. The connector bars 46 maintain the support bar 42 at a fixed distance from the mold cavity support plate 14 and in effect "tow" the support bar 42 along the tie bars 20.

Figure 4:
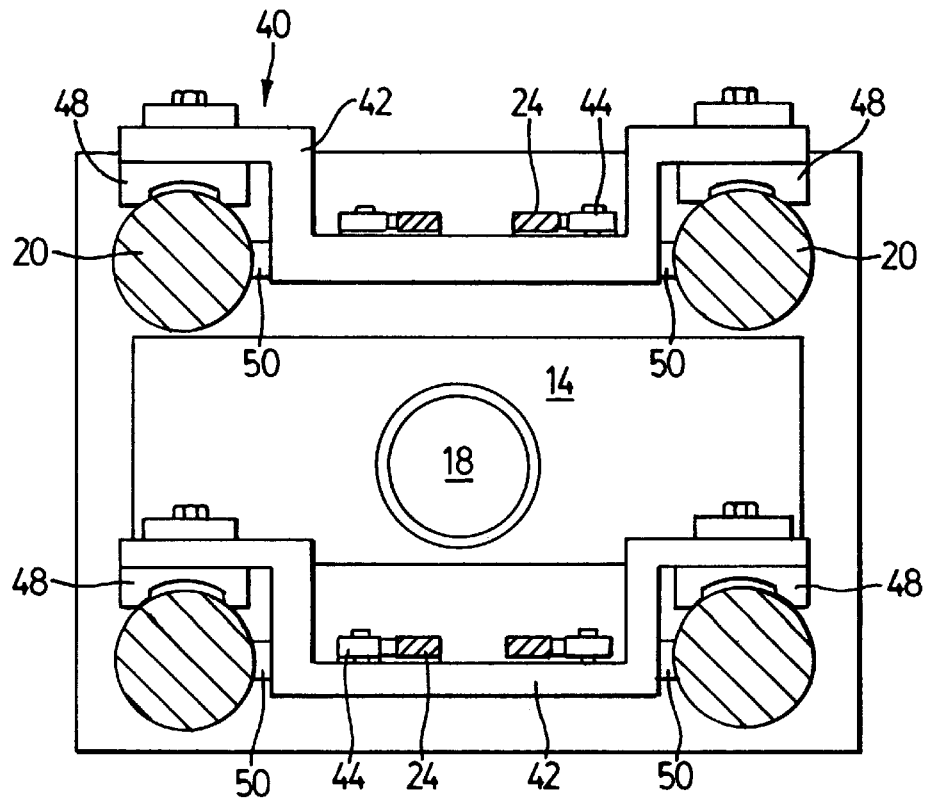
FIG. 4 is a section on line 4—4 of FIG. 2.

The support bar 42, as shown in FIG. 4, may be slidably supported on the tie bars 20 by bearing members 48 which act to prevent inward movement of the support bar 42. Any suitable bearing members 48 may be utilized which provide relatively low friction and low wear on the tie bars 20. Suitable results have been achieved using bronze and a film of grease or NYLATRON (™) plastic blocks. In some lighter duty applications it may not be necessary to provide bearing blocks, such as 48, as the connector bars 46 (or similar structure) may be relied upon to hold the support bar 42 adjacent the tie bars 20. In other words, the support bar 42 may be described moveable along the tie bars 20 without necessarily requiring that the tie bar support the support bar 42 of the actuator carriage 40.

The support bar 42 is also provided with further bearing members 50 which act as a lateral restraint to restrict movement of the support bar toward the tie bars 20. The bearing members 50 may be of a similar material to the bearing members 48 and they may be combined, at least in some applications.

As the support bar 42 and therefore the actuators 44 are spaced apart from the mold cavity support plate 14, the first legs 28 of the lever arms 24 may be considerably shorter than in the prior art arrangement and, in many applications, would not have to pass by the centre manifold plate support 17 during mold closing. Furthermore, the shorter first legs 28 are more rigid and produce more platen movement for a given cam profile and length of the second leg 34 than in the prior art arrangement.

Figure 2:
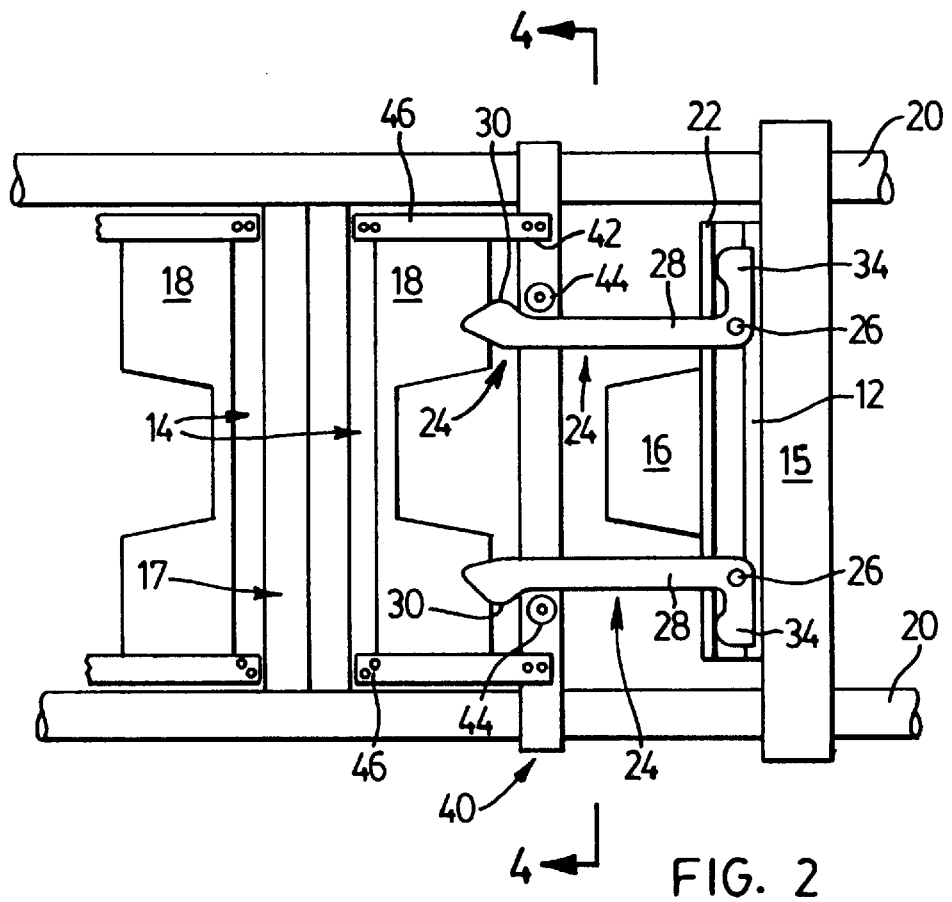
FIG. 2 is a top plan view illustrating an actuator carriage according to the present invention mounted on a multi-level injection molding apparatus.
Figure 3:
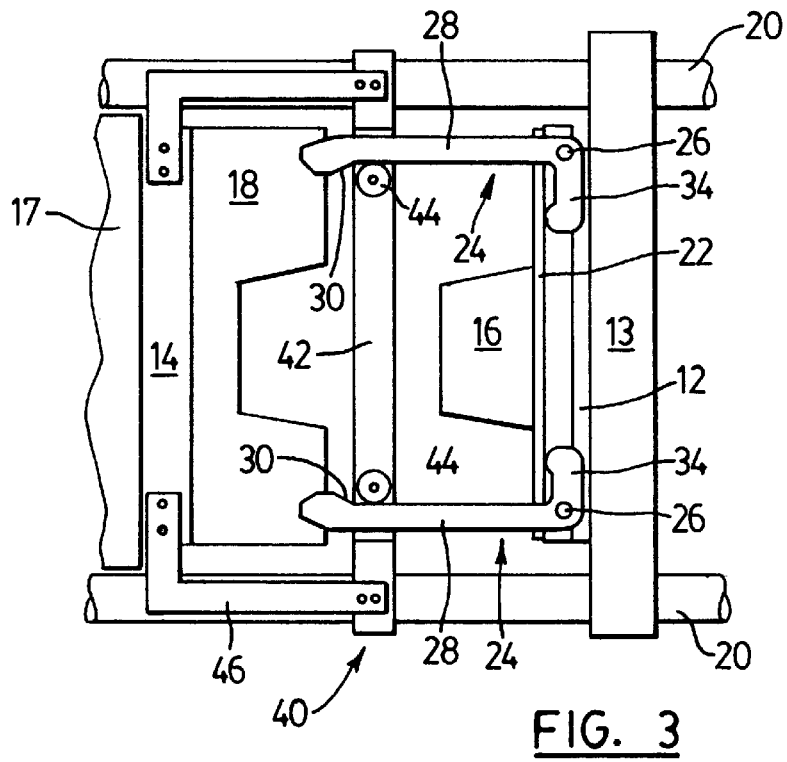
FIG. 3 is a top plan view similar to FIG. 2 but showing an alternate lever arm layout.

The lever arms 24 may be mounted for actuation in a direction away from the adjacent tie bars 20 as illustrated in FIG. 2, or toward the adjacent tie bars 20 as illustrated in FIG. 3. The FIG. 2 arrangement has the advantage that the support bar 42 does not need to extend fully across the space between the tie bars 20 as the actuation force on each actuator 44 is substantially transverse toward the respective tie bar 20 and would be countered by the bearing members 50.

The FIG. 3 arrangement has the advantage of providing more space between the lever arms 24 to allow better access to the mold core 16 and mold cavity 18 for servicing.

Lever arms 24 would typically be provided on opposite sides of the mold assembly to balance forces and minimize the potential for jamming.

Although the illustrations show support bars 42 extending horizontally between the tie bars 20, in many applications the support bars 42 may be mounted vertically between upper and lower of the tie bars 20. Only some mold centering devices favour the former. Positioning of the actuator carriage 40 must also take into account possible take-off equipment, as the actuator carriage 40 must be positioned so as not to interfere with such take-off equipment.

Lever type actuators are used not only in stripper platen stripper mechanisms, but also in other stripper mechanisms such as ejector box based stripper mechanisms. The present invention is applicable also to such ejector box based mechanisms.

Figure 5:
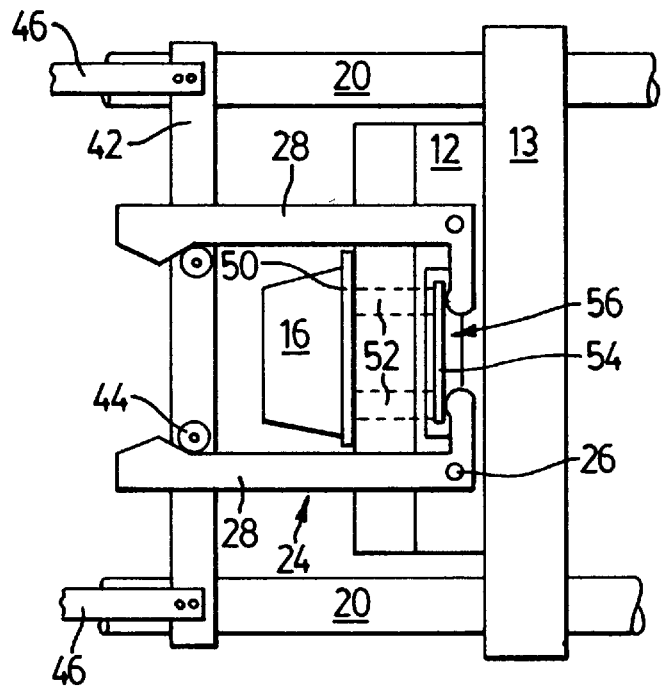
FIG. 5 is a view similar to FIG. 4 of an alternate embodiment of the present invention; and, FIG. 6 is a view similar to FIGS. 4 and 5 of another alternate embodiment of the present invention.

FIG. 5 illustrates an alternate embodiment wherein a stripper ring 50 is used as a stripper mechanism in lieu of a stripper platen. The stripper ring 50 is connected by rods 52 to an ejector plate 54 in an ejector box 56 in the mold core support plate 12. Lever arms 24 actuate the ejector plate 54.

Figure 6:
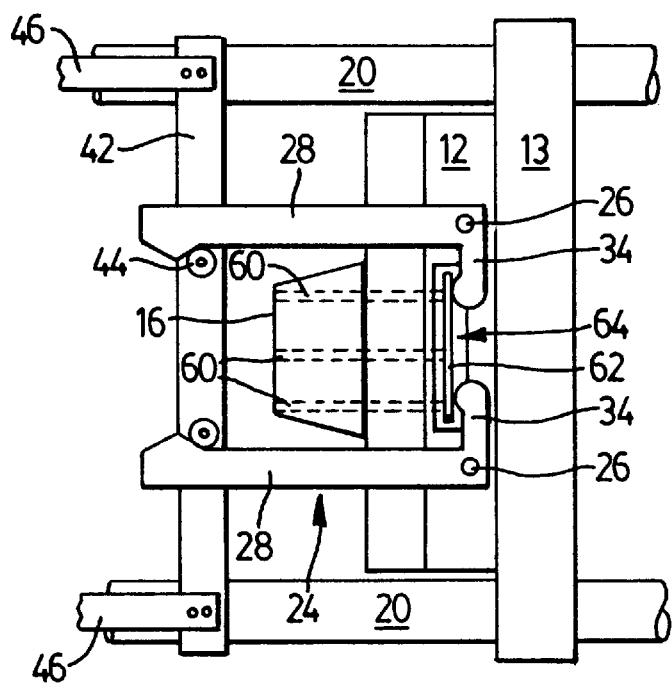

FIG. 6 illustrates another alternate embodiment wherein ejector pins 60 are used as part of the stripper mechanism. The ejector pins 60 are connected to an ejector plate 62 in an ejector box 64. The ejector plate 60 is actuated by the lever arms 24.

The above description is intended in an illustrative rather than a restrictive sense. Variations to the exact structures described may be apparent to persons skilled in the relevant arts without departing from the spirit and scope of the present invention as defined by the claims set out below.

What is claimed is:

1. An actuator carriage for a multi-level injection molding apparatus having mold core and mold cavity support plates, tie bars supporting a moveable platen and having a stripper mechanism associated with mold cores mounted to said mold core support plates, said stripper mechanisms being displaced relative to said mold cores by lever arms having cam surfaces engaging actuators carried by said actuator carriage, each said actuator carriage comprising:

a support bar extending generally transversely relative to said tie bars, at least one of said actuator being mounted on said support bar;

at least one connector bar rigidly connected to said support bar and a respective mold cavity support plate, said connector bar maintaining said support bar at a fixed distance from said mold cavity support plate;

said support bar being moveable along at least one of said tie bars and having a lateral restraint to restrict movement of said support bar toward respective of said tie bars in response to said cam surfaces engaging said actuators.

2. An actuator carriage as claimed in claim 1 wherein said support bar extends between adjacent ones of said tie bars.

3. An actuator carriage as claimed in claim 2 wherein two said actuators are mounted to said tie bar.

4. An actuator carriage as claimed in claim 2 wherein said support bar includes bearing members slidably engaging said tie bars to vertically locate said support bar relative to said tie bars and to act as said lateral restraint.

5. An actuator carriage as claimed in claim 3 wherein said support bar includes bearing members slidably engaging said tie bars to vertically locate said support bar relative to said tie bars and to act as said lateral restraint.

6. An actuator carriage as claimed in claim 4 wherein said support bar extends between an upper pair of said tie bars.

7. An actuator carriage as claimed in claim 5 wherein said support bar extends between an upper pair of said tie bars.

8. An actuator carriage as claimed in claim 3 wherein each said support bar extends between an upper and a lower tie bar and includes bearing members acting between said support bar and said upper and lower tie bars as said lateral restraint.

9. An actuator carriage as claimed in claim 1 wherein said lateral restraint is a bearing member acting between said support bar and a respective one of said tie bars.

\* \* \* \* \*